United States Patent
Veldhuizen

(10) Patent No.: US 10,719,513 B2
(45) Date of Patent: *Jul. 21, 2020

(54) SALIENT SAMPLING FOR QUERY SIZE ESTIMATION

(71) Applicant: Infor (US), Inc., New York, NY (US)

(72) Inventor: Todd L. Veldhuizen, Waterloo (CA)

(73) Assignee: Infor (US) Inc., New York, NY (US)

(*) Notice: Subject to any disclaimer, the term of this patent is extended or adjusted under 35 U.S.C. 154(b) by 257 days.

This patent is subject to a terminal disclaimer.

(21) Appl. No.: 15/723,474

(22) Filed: Oct. 3, 2017

(65) Prior Publication Data

US 2018/0025056 A1    Jan. 25, 2018

Related U.S. Application Data

(63) Continuation of application No. 14/298,201, filed on Jun. 6, 2014, now Pat. No. 9,779,137.

(Continued)

(51) Int. Cl.
*G06F 7/02* (2006.01)
*G06F 16/00* (2019.01)
(Continued)

(52) U.S. Cl.
CPC .... *G06F 16/24545* (2019.01); *G06F 16/2282* (2019.01); *G06F 16/2453* (2019.01); *G06F 16/24535* (2019.01)

(58) Field of Classification Search
CPC ......... G06F 17/30463; G06F 16/24542; G06F 17/30469; G06F 16/24545;
(Continued)

(56) References Cited

U.S. PATENT DOCUMENTS

| 5,890,150 A | 3/1999 | Ushijima et al. |
| 6,226,629 B1 | 5/2001 | Cossock |

(Continued)

FOREIGN PATENT DOCUMENTS

| JP | 11353331 A | 12/1999 |
| JP | 2012079078 A | 4/2012 |

OTHER PUBLICATIONS

Supplementary European Search Report and Written Opinion dated Oct. 25, 2016 for Related European Patent Application No. EP14822444.7 (9 pages).

(Continued)

*Primary Examiner* — Bruce M Moser
(74) *Attorney, Agent, or Firm* — Blank Rome LLP

(57) ABSTRACT

Salient sampling for query size estimation includes identifying two or more columns in a database table that have corresponding columns in one or more other tables. One or more hash functions are applied to domains of each of the identified columns. A first hash function is applied to a domain of the first column and a second hash function to a domain of the second column. A subset of the rows in the database table is selected. The selecting includes selecting rows in the database table where results of the first hash function meet a first numeric threshold and selecting rows in the database table where results of the second hash function meet a second numeric threshold. A sample database table corresponding to the database table is created. The sample database table includes the selected subset of the rows in the database table.

20 Claims, 6 Drawing Sheets

Related U.S. Application Data

(60) Provisional application No. 61/844,045, filed on Jul. 9, 2013.

(51) Int. Cl.
  G06F 16/2453 (2019.01)
  G06F 16/22 (2019.01)

(58) Field of Classification Search
  CPC .......... G06F 17/30442; G06F 16/2453; G06F 17/30339; G06F 16/2282; G06F 17/30451; G06F 16/24535; G06F 17/30; G06F 16/00
  See application file for complete search history.

(56) References Cited

U.S. PATENT DOCUMENTS

| | | |
|---|---|---|
| 7,136,850 B2 | 11/2006 | Keller et al. |
| 7,188,334 B1 | 3/2007 | Sinclair |
| 7,249,120 B2 | 7/2007 | Bruno et al. |
| 7,593,931 B2 | 9/2009 | Zuzarte et al. |
| 7,636,707 B2 | 12/2009 | Chaudhuri et al. |
| 7,668,804 B1 | 2/2010 | El-Helw et al. |
| 7,707,207 B2 | 4/2010 | Shriraghav et al. |
| 7,805,411 B2 | 9/2010 | Ziauddin et al. |
| 7,877,374 B2 | 1/2011 | Zabback et al. |
| 7,945,558 B2 | 5/2011 | Krishna |
| 8,140,516 B2 | 3/2012 | Bhattacharjee et al. |
| 8,185,519 B2 | 5/2012 | Chaudhuri et al. |
| 8,285,709 B2 | 10/2012 | Candea et al. |
| 2002/0178151 A1 | 11/2002 | Chaudhuri et al. |
| 2006/0074875 A1 | 4/2006 | Faunce et al. |
| 2007/0156736 A1 | 7/2007 | Bestgen et al. |
| 2008/0052269 A1 | 2/2008 | Abdo et al. |
| 2008/0086444 A1 | 4/2008 | Yu et al. |
| 2008/0306903 A1 | 12/2008 | Larson et al. |
| 2010/0082648 A1 | 4/2010 | Potapov et al. |
| 2010/0191720 A1 | 7/2010 | Al-Omari et al. |
| 2011/0029507 A1 | 2/2011 | Au et al. |
| 2012/0317094 A1 | 12/2012 | Bear et al. |
| 2013/0024430 A1 | 1/2013 | Gorelik |
| 2013/0144815 A1 | 6/2013 | Luo et al. |
| 2013/0226903 A1 | 8/2013 | Wu et al. |
| 2014/0052726 A1 | 2/2014 | Amberg et al. |
| 2014/0214794 A1* | 7/2014 | Attaluri ............... G06F 16/2456 707/714 |
| 2014/0317087 A1 | 10/2014 | Collins |

OTHER PUBLICATIONS

Haas, P. et al., "Selectivity and Cost Estimation for Joins Based on Random Sampling," Journal of Computer and System Sciences, vol. 52, No. 3, Jun. 1, 1996, pp. 550-569.

Hadjieleftheriou et al., Hashed Samples: Selectivity Estimators for Set Similarity Selection Queries, in Proceeding of the VLDB Endowment, vol. 1, No. 1, Aug. 2008, 12 pages.

Larson et al., "Cardinality Estimation Using Sample Views with Quality Assurance," Proceedings of the 2007 ACM SIGMOD International Conference on Management of Data. ACM, 2007, 12 pages.

Khachatryan et al., "Quantifying Uncertainty in Multi-Dimensional Cardinality Estimations," Proceedings of the 19th ACM International Conference on Information and Knowledge Management. ACM, 2010; 4 pages.

International Search Report and Written Opinion from Related Application No. PCT/US2014/044271; Intl Filing Date: Jun. 26, 2014; dated Oct. 27, 2014; 9 pages.

Abhirama et al., "Stability-Conscious Query Optimization," Technical Report—TR-2009-01; Database Systems Lab; Oct. 2009; 43 pages.

Estan et al., "End-Biased Samples for Join Cardinality Estimation," International Conference on Data Engineering, Apr. 2006, 12 pages.

* cited by examiner

SALIENT SAMPLING FOR QUERY SIZE ESTIMATION

CROSS-REFERENCE TO RELATED APPLICATION

This application is a Continuation of U.S. patent application Ser. No. 14/298,201 filed Jun. 6, 2014, issued as U.S. Pat. No. 9,779,137 on Oct. 3, 2017, which claims the benefit of U.S. Provisional Patent Application No. 61/844,045 filed Jul. 9, 2013, the contents of all are incorporated herein by reference in their entirety.

BACKGROUND

The present invention relates generally to database operations and, more specifically, to providing sample data for database query size estimation.

Database management systems enable users to query large collections of information. There are many execution plans that a database management system could potentially employ to answer a given query. Query optimization is the process in which the database management system estimates the cost of a number of candidate plans, and chooses the one with the lowest cost.

An important step in database query cost estimation is the estimation of sizes of intermediate query results that often influence the cost of a plan associated with the database query. The database system aims to accurately estimate these sizes with a relatively small effort, without actually executing the query. A number of techniques are often used for estimating such sizes. One general class of techniques for estimating query result sizes is referred to as sampling. In sampling, the system obtains a sample from one or more of the participating tables and performs a variant of the query over the sample. The query result size over the sample is scaled appropriately to estimate the size of the query over the full data set.

Sampling can also be used for various kinds of estimation tasks that are separate from query optimization. For example, if a rough estimate of a query result is all that is needed, processing a suitably sized sample is often used to provide a good balance between accuracy and computation time.

SUMMARY

Embodiments include a method, system, and computer program product for creating samples of database tables. Two or more columns in a database table are identified that have corresponding columns in one or more other tables. The two or more columns include a first column and a second column. One or more hash functions are applied to domains of each of the identified columns. The applying includes applying a first hash function to a domain of the first column and applying a second hash function to a domain of the second column. A subset of the rows in the database table is selected based on results of applying the one or more hash functions. The selecting includes selecting rows in the database table where results of the first hash function meet a first numeric threshold and selecting rows in the database table where results of the second hash function meet a second numeric threshold. A sample database table corresponding to the database table is created. The sample database table includes the selected subset of the rows in the database table.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

Figure 1:
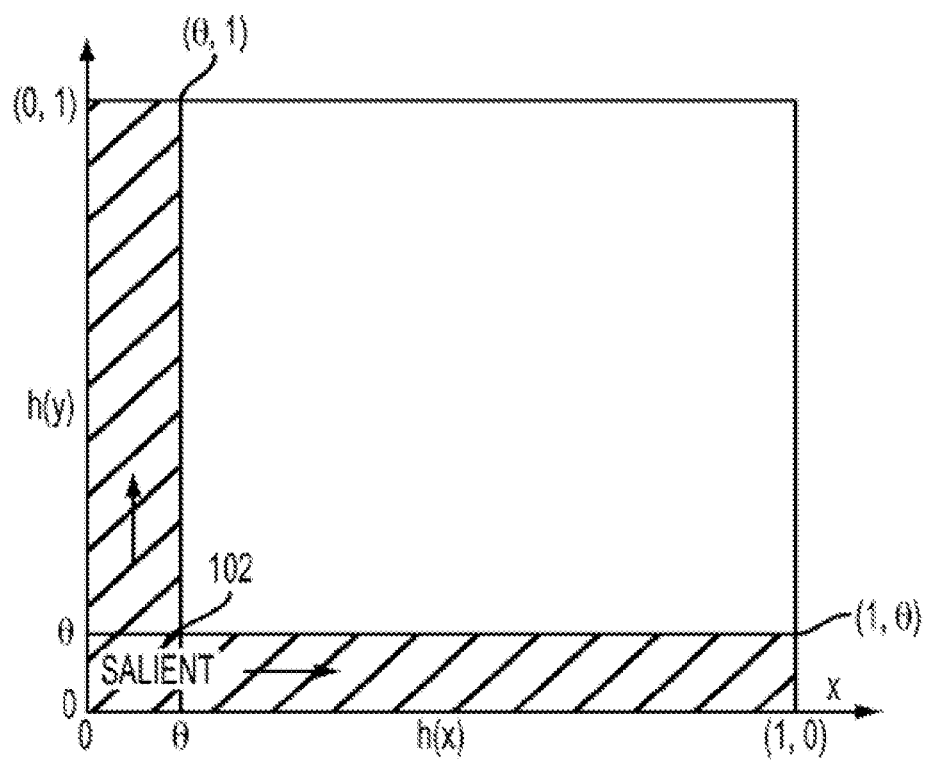
FIG. 1 depicts a chart that shows geometrically how sampling can take place in two dimensions in accordance with an embodiment.

The present invention relates generally to database operations and, more specifically, to providing sample data for database query size estimation. Embodiments are directed to creating a sample of two or more tables that will be used in a query. In an embodiment, creating the sample includes choosing a hash function for each domain of one or more attributes in the query result. The dimensionality of the query (i.e., the number of columns to be joined) can be determined by counting the number of distinct variables that are not equated to prior variables or constants in the query. The salient region of the determined dimensionality can be calculated for each table mentioned in the query based on the chosen hash functions and a numeric threshold. Those records within the salient region can then be included in a sample of each table mentioned in the query.

Embodiments are contrasted with conventional sampling where a random subset of known size is chosen from the underlying data set. Conventional sampling is adequate for some purposes, but has disadvantages when data from multiple tables is combined.

Sampling techniques may employ hashing to sample a data set at a specified rate. For example, suppose that a database includes a table R denoted R(X,Y,Z) having three attributes X, Y, and Z. The system chooses a hash function H that maps the domain of attribute X to a range, say $1, \ldots, N$. Let $R^S(X,Y,Z)$ denote the subset of R(X,Y,Z) where $H(X) \leq d$, where "d" is a selected threshold value in the range $1, \ldots, N$. If H is a hash function that distributes its domain uniformly over $1, \ldots, N$, and if H is chosen independently of the actual values in R(X,Y,Z), then $R^S(X,Y,Z)$ is expected to be a sample that is d/N times the size of R(X,Y,Z). The size of R(X,Y,Z) can be estimated by sampling as above to obtain an estimate of $N \times |R^S(X,Y,Z)|/d$ for $|R(X,Y,Z)|$, where $|R(X,Y,Z)|$ denotes the number of records in table R.

Hash-based sampling can have advantages over conventional sampling when combining data from multiple tables using equi-joins (e.g., joins were the condition relating the two tables is an equality condition). For example, suppose $R(X,Y,Z)$ and table S, denoted $S(X)$ having one attribute X, were both sampled as above with a common value of the threshold d, to yield samples $R^S(X,Y,Z)$ and $S^S(X)$. In addition, it is assumed that attribute X is uniformly distributed over a large domain in both tables. Then, the natural join of $R^S(X,Y,Z)$ and $S^S(X)$ would also be a d/N sample of the natural join of $R(X,Y,Z)$ and $S(X)$. In contrast, independent conventional samples of $R(X,Y,Z)$ and $S(X)$ that did not make sure that common X values are included would lead to a join result of the samples that would only be a $(d/N)^2$ sample of the full join.

For convenience, in embodiments described herein, the hash range is mapped to the interval [0,1] by defining $h(x)=H(x)/N$, where N is the maximum value of the range of H. Similarly, the threshold d can be mapped to a suitable threshold $\theta=d/N$. The interval [0,1] is selected and used herein for ease of description. Other intervals can be implemented by other embodiments.

To achieve certain desirable properties in an embodiment, the hash function h may be chosen at random from a known class of strongly universal hash functions. A hash function h that distributes items uniformly over [0,1] can be selected so that the probability that a randomly chosen value x satisfies $h(x) \leq \theta$ is $\theta$. In addition, in an embodiment, considering all hash functions h in the class for distinct values x and y in the domain, the probabilities that $h(x) \leq \theta$ and that $h(y) \leq \theta$ are independent of each other.

Consider a two-way join between $R(X,Y,Z)$ and $S(X)$ with sampling thresholds $\theta_R$ and $\theta_S$ respectively on column X alone. In this example, $\theta$ is defined to be the minimum of $\theta_R$ and $\theta_S$. In addition, $R^S(X,Y,Z)$ and $S^S(X)$ are the corresponding samples. The size of the join of $R^S$ and $S^S$ can be estimated to be the size of the join of R and S multiplied by $\theta$. Under the assumptions about hash functions mentioned above, it can be shown mathematically that, averaged over all hash functions, the relative error of this estimate diminishes towards zero as the size of the join result increases.

While variants of hash-based sampling techniques have previously been described (see for example, Hadjieleftheriou, et al., "Hashed Samples: Selectivity Estimators for Set Similarity Selection Queries," Very Large Data Bases (VLDB) 2008; Estan, et al., "End-biased Samples for Join Cardinality Estimation," International Conference on Data Engineering, April 2006), these sampling techniques describe sampling one attribute at a time (e.g., sampling in one dimension). Contemporary techniques do not process, nor do they consider, hash-based sampling schemes over multiple simultaneous attributes as described herein. Embodiments of the present invention extend hash-based sampling to multiple dimensions, and provide methods to estimate the size of a complex join expression given samples of each of the participating tables.

Turning now to an example, it is assumed initially that all attributes share a common domain. In such a case, each attribute can be hashed using a common hash function h. For the purposes of sampling, each table R is associated with a threshold $\theta_R$. A record from a table is then included in if one or more of its attributes satisfies the hash sampling condition relative to the threshold. For example, a record (a,b,c) in $R(X,Y,Z)$ would be included if $h(a) \leq \theta_R$ or $h(b) \leq \theta_R$ or $h(c) \leq \theta_R$. In other words, (a,b,c) in $R(X,Y,Z)$ is sampled if $\min(h(a),h(b),h(c)) \leq \theta_R$. In this example, hash-based sampling is performed in three dimensions (i.e., has a dimensionality of three).

Turning now to FIG. 1, a graph that depicts geometrically how sampling can take place in two dimensions in accordance with an embodiment is generally shown. As depicted in FIG. 1, there is one dimension for each attribute in the table (or join expression). In this example, a table denoted $T(X,Y)$ includes two attributes X and Y. The region of the multidimensional space that is covered by the sampling condition is referred to herein as the "salient region" or simply as the "salient." The volume "v" of the salient 102 shown in FIG. 1 can be given by v, where $v=1-(1-\theta)^k$ where k is the number of dimensions. In an embodiment, when the threshold, $\theta$, is sufficiently small, v can be approximated as $k\theta$. The salient 102 shown in FIG. 1 represents the area where the hash value of X, "h(x)", or the hash value of Y, "h(y)", is less than or equal to the threshold, $\theta$.

Figure 2:
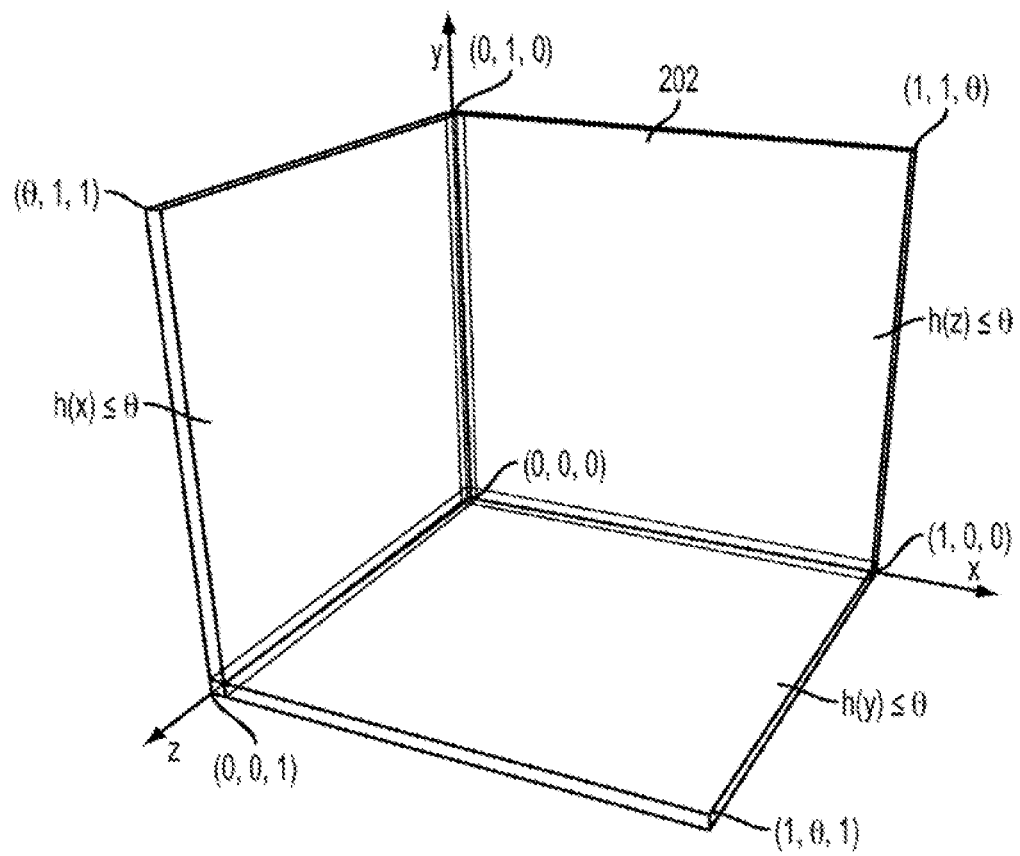
FIG. 2 depicts a chart that shows geometrically how sampling can take place in three dimensions in accordance with an embodiment.

Turning now to FIG. 2, a graph that depicts geometrically how sampling can take place in three dimensions in accordance with an embodiment is generally shown. As depicted in FIG. 2, there is one dimension for each attribute in the table (or join expression). In this example, a table denoted $T(X,Y,Z)$ includes three attributes X, Y, and Z. As described previously, the volume "v" of the salient 202 shown in FIG. 2 can be given by v, where $v=1-(1-\theta)^k$ where k is the number of dimensions. In an embodiment, when the threshold, $\theta$, is sufficiently small, v can be approximated as $k\theta$. The salient 202 shown in FIG. 2 represents the union of the volumes where the hash value of X, "h(x)", or the hash value of Y, "h(y)", or the hash value of Z, "h(z)" is less than or equal to the threshold, $\theta$.

The size of the join of k-dimensional samples $R^S$ and $S^S$ can be estimated to be the size of the join of R and S multiplied by $v=1-(1-\theta)^k$, where k is the number of dimensions. When one of the participating tables in a join has lower dimension than the expression as a whole, an embodiment can adjust the salient region so that it can be defined properly over a higher dimensional space. For example, consider again the join of $R(X,Y,Z)$ and $S(X)$ where sampling is now being performed three-dimensionally, over X, Y, and Z. Suppose a sample $R^S(X,Y,Z)$ of R is obtained using a three-dimensional hash sampling method such as that shown in FIG. 2, and a sample $S^S(X)$ of S is obtained using a one-dimensional hash sampling method. Suppose both methods use a common threshold $\theta$. Then, in the join of $R^S(X,Y,Z)$ and $S^S(X)$, all records from table S will satisfy $h(X) \leq \theta$. This is a proper subspace of the salient region for the join of $R(X,Y,Z)$ and $S(X)$. The join of the two samples would have size only a fraction $\theta$ of the full join, rather than a fraction v of the full join. Thus, the join of the samples does not have a three-dimensional distribution that would match that of a sample of the full join between tables R and S. For example, a three dimensional sample of the full join would include some rows with X values that do not meet the sampling threshold, while the join of the samples would not.

To remedy this problem, an embodiment of the proposed technique can pad lower-dimensional tables with values from the domain for absent attributes. For example, suppose $D(Y)$ can be written to mean that Y can be any value from domain D of attribute Y and $D(Z)$ any value from domain D of attribute Z. Conceptually, the sample $S^S$ can now be defined in three dimensions, as the hash-based sample of the cross-product $S(X) \times D(Y) \times D(Z)$. In practice, it is not necessary to fully materialize $S^S$ as only the portion of the X range that hashes to values at most $\theta$ will be explicitly stored. The remaining components can be represented symbolically. When $R^S$ and the new $S^S$ are joined, the symbolic components of $S^S$ (on variables Y and Z, asserting that $h(y) \leq \theta$ or $h(z) \leq \theta$) are translated into selections on those attributes in $R^S$.

When the tables participating in a join have been sampled with different thresholds $\theta_i$, the minimum value of those thresholds defines the threshold for the sample of the join.

Figure 3:
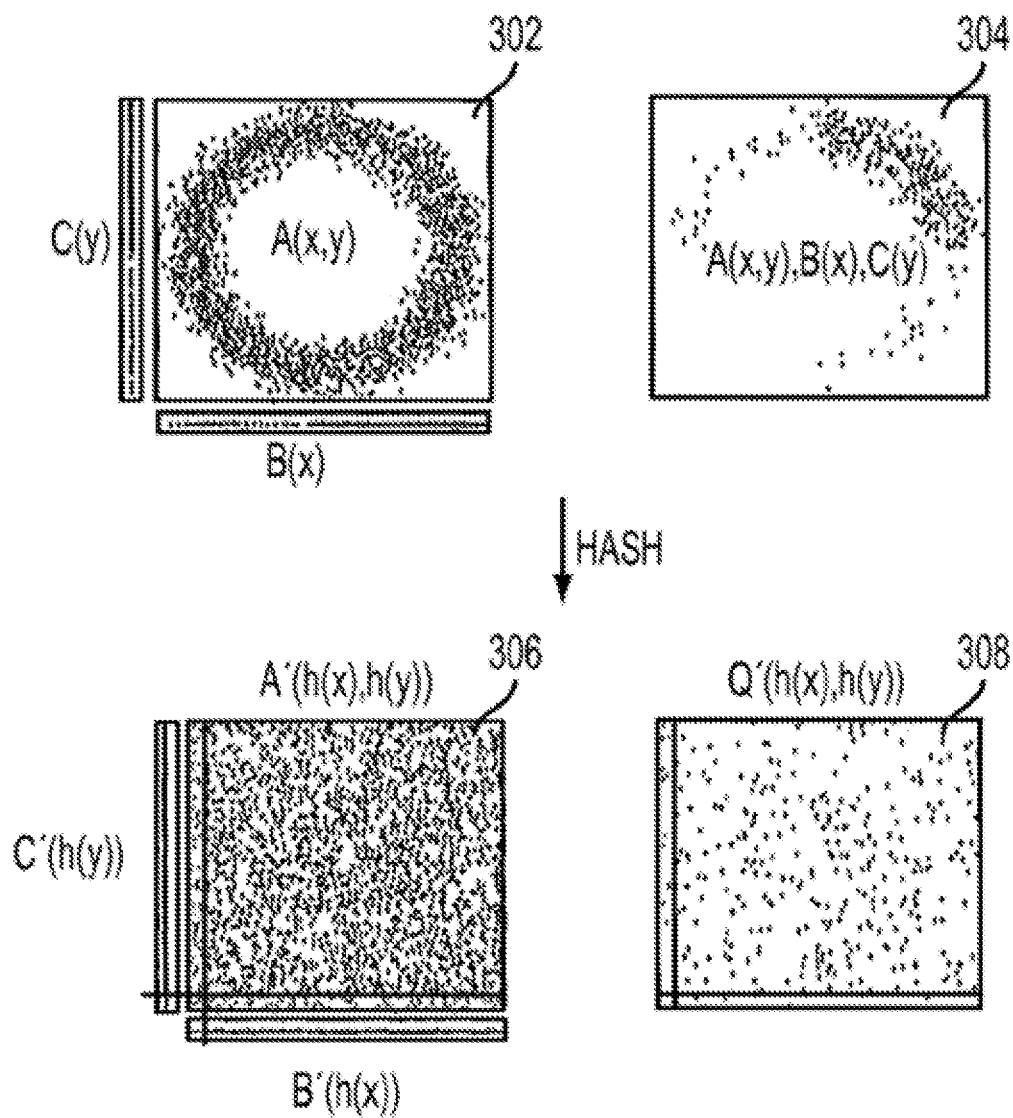
FIG. 3 depicts examples of original and hash space views of a two-dimensional query in accordance with the proposed sampling technique.

Referring now to FIG. 3, results of compound join expressions that include more than one join are generally shown in accordance with the proposed sampling technique. FIG. 3 depicts examples of original and hash space views of a query in accordance with an embodiment that considers the natural join of three tables A(X,Y), B(X), and C(Y) in two dimensions. Graph 302 illustrates input tables in two dimensional (x,y) coordinates. Each of the three tables is skewed: both B and C take on higher values from the domain, while table A has a distribution in which the (x,y) values are concentrated in a roughly donut-shaped cluster. Graph 304 in FIG. 3 shows the result of the full join on this dataset. Graphs 306 and 308 in FIG. 3 show the inputs and query result in a hash-transformed space that includes (h(x),h(y)) coordinates. The effect of this transformation is to make the data appear more uniform than it did originally. The salient region includes the left and bottom slices of the space.

Figure 4:
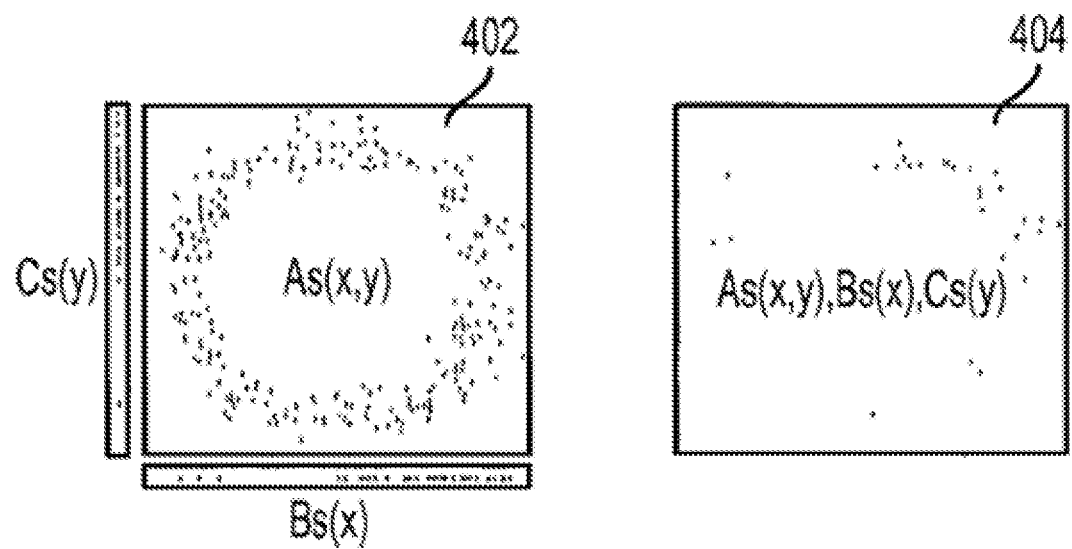
FIG. 4 depicts an example of sampled data and a result of joining the samples in accordance with an embodiment.

Referring now to FIG. 4, an embodiment of the sampled data in accordance with an embodiment is generally shown. The sampled data shown in FIG. 4 is based on graphs 302 and 304 in FIG. 3. Graph 402 depicts the sampled data and graph 404 depicts the join of the sampled data in the original (x,y) coordinates using an embodiment of the hash-based sampling techniques described herein. As shown in FIG. 4, for this data set, the join of the sampled data is representative of the full join shown in graph 304 of FIG. 3.

Figure 5:
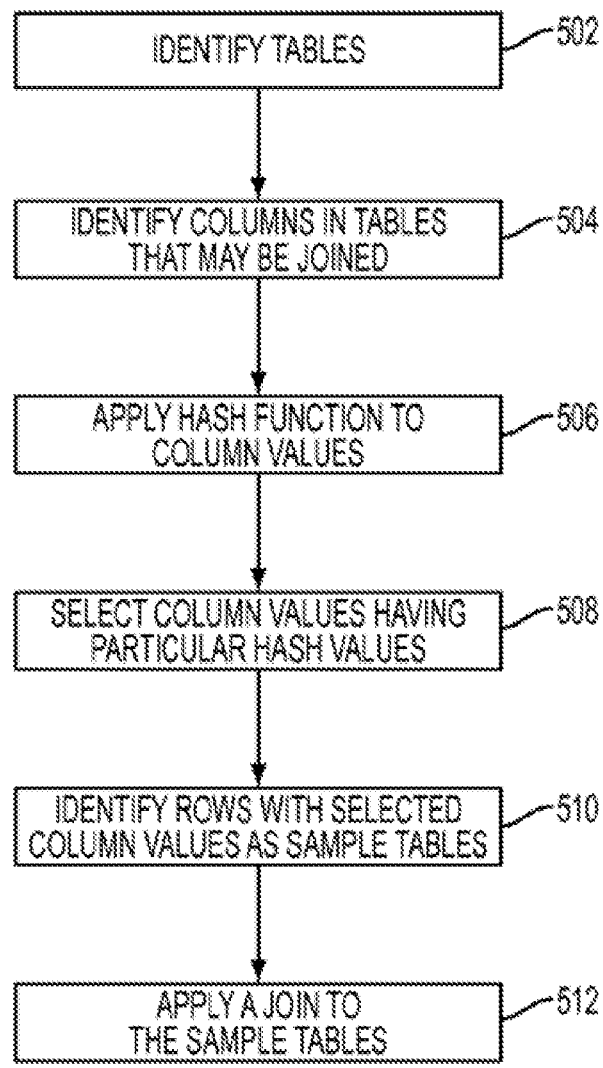
FIG. 5 depicts a flow chart of salient sampling for query size estimation in accordance with an embodiment.

Turning now to FIG. 5, a flow diagram for salient sampling for query size estimation is generally shown in accordance with an embodiment. At block 502, the tables to be sampled are identified based on the query expression, and at block 504, the columns that may be joined in the tables are identified as specified in the query expression. For clarity a logic-based language has been used for writing queries, in which the columns in different tables share a common variable name when they are joined. Nevertheless, other languages such as SQL could be used instead, and having a common attribute name is not required for columns to be joinable. At block 506, a hash function is applied to the data values in the identified columns in each table. In an embodiment, there is one hash function for each domain type. Any hash function known in the art can be utilized, but hash function families that are universal may be preferred.

At block 508, column values having particular hash values are selected. As described previously, this can be based on a threshold number and in an embodiment all or a subset of the selected column values are compared to the same threshold number.

At block 510, the rows associated with the selected column values are identified to generate sample tables to be used for sampling. In the case that a table has lower dimension than the dimension of the query as a whole, the table is symbolically padded with extra columns to match the overall dimension. At block 512, a join, or other query, is applied to the sample tables to generate a sample of the join.

Embodiments are not limited to implementing sample tables for sampling based on fixed dimensional salient regions. There is no upper bound on the number of dimensions, and salient regions based on any number of dimensions may be implemented by embodiments.

In an embodiment, the size of the full join is estimated by scaling the join result of the samples by a factor of $1/v$ where $v$ is the volume of the salient region. In some cases, this procedure can give an estimate whose error bounds can be quantified.

Consider a database in which no record contains the same value in more than one attribute. Suppose also that no single value $x$ occurs in more than $|Q|^\beta$ records, where $\beta$ is a number between 0 and 1, Q is an equi-join query, and $|Q|$ is the number of records in the full join. Under such conditions, the following theorem holds: averaged over all hash functions, the relative error of the $1/v$ approximation diminishes to zero as the database size increases, as long as the expected number of records in the join of the samples is at least proportional to $|Q|^{(\beta+1)/2}$.

The preconditions of the above theorem suggest special cases that need specific attention, that is, those values that appear in multiple attributes of a row and those values that appear very frequently in the database. To address these cases, an embodiment of the proposed method can break the sampling problem into several subsampling problems for disjoint subspaces of the original sampling space. To deal with databases in which a significant number of records contain the same value in more than one column, an embodiment of the proposed method can divide the sampling problem into a subset where no column values are common and into subsets where there are common column values. The subsets are disjoint, and so the overall cardinality can be estimated by taking the sum of the estimates for each subset. For example, consider a three-attribute query Q(X,Y,Z). Q can be expressed as: $Q_1 \cup Q_2 \cup Q_3 \cup Q_4 \cup Q_5$, where $Q_1 = \sigma_{(X=Y=Z)}Q$, $Q_2 = \sigma_{(X=Y \neq Z)}Q$, $Q_3 = \sigma_{(X=Z \neq Y)}Q$, $Q_4 = \sigma_{(Z=Y \neq X)}Q$, and $Q_5 = \sigma_{(X \neq Z, Y \neq Z, X \neq Y)}Q$. The estimate for $|Q|$ can be the sum of estimates, $|Q_1| + |Q_2| + |Q_3| + |Q_4| + |Q_5|$. $|Q_5|$ can be estimated as above, because no column values are common. For $Q_1$, because all columns are equal, the table is effectively one-dimensional rather than three-dimensional. Geometrically, it corresponds to a diagonal of the (X,Y,Z) cube for Q. Because of this smaller dimensionality, $|Q_1|$ can be estimated as above, but using $k=1$ rather than $k=3$. In a similar way, each of $|Q_2|$, $|Q_3|$, and $|Q_4|$ can be estimated with $k=2$, since they correspond to two-dimensional subsets of the original space.

As a heuristic optimization, it may be possible to do less sampling work by avoiding cases that are unlikely to contribute to the estimate. For example, suppose that in Q, attribute X is an employee-id and attribute Y is the employee-id of X's manager. Apart from the chief executive officer (CEO) of the company (who is their own manager), X will never equal Y in Q. It is therefore reasonable to ignore $|Q_1|$ and $|Q_2|$ in estimating $|Q|$ above. This is only a heuristic optimization, because one can construct examples where including $|Q_1|$ and $|Q_2|$ is important, such as when the only answers to Q have X being the identification of the company's CEO.

When a single value w occurs in a significant fraction of all records, the quality of the estimate may be poor. Either $h(w)$ is in the salient region, in which case the query estimate is likely to be an overestimate of the true query size, or $h(w)$ is not in the salient region, in which case the query estimate is likely to be an underestimate of the true query size. To deal with very common values, an embodiment can apply a subsampling approach. Suppose that for the query Q above, w is a value for Z that occurs in a large fraction of the records. For example, Z may be the medical plan of an employee, and 50% of the employees may be enrolled in the most popular plan represented by w. Then Q can be expressed as: $T_1 \cup T_2$ where, $T_1 = \sigma_{(w=Z)}Q$ and $T_2 = \sigma_{(w \neq Z)}Q$. The estimate for |Q| is the sum of estimates, $|T_1|+|T_2|$. Following the subsampling approach above, $|T_1|$ would be estimated with k=2, and $|T_2|$ would be estimated with k=3. If there are multiple common values, as may often happen with attributes having a very small number of options, then an embodiment of the proposed method would subsample the query using separate cases for each of the common values. When attributes from the query come from more than one domain, each domain D can have its own hash function $h_D$. The salient region is defined as before, except that each attribute is hashed using its domain's hash function.

Technical effects and benefits include the ability to create sample data that may more accurately predict query cost estimations and other database estimations that are based on sampled data.

In some embodiments, one or more methods are embodied in a set of instructions for one or more processors having access to one or more types of memory. The instructions could be coded in hardware or in software. Many kinds of platforms may be used, including but not limited to: computers, mobile telephones, tablet devices, game consoles, network management devices, field-programmable gate arrays, and cloud-based computer systems. Aspects of the disclosure could be deployed on multiple devices for concurrent operation. Embodiments may be used as a component of a larger system such as a database management system.

Figure 6:
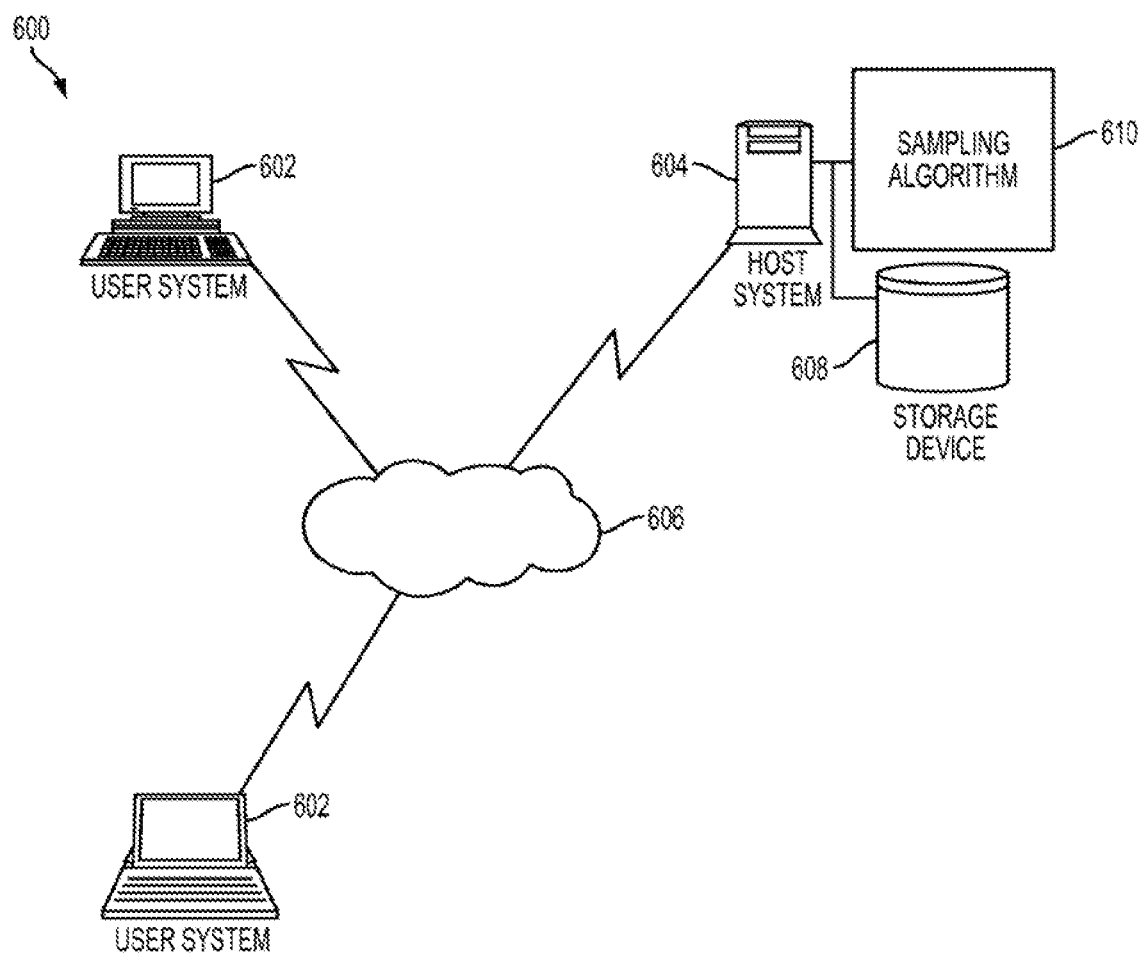
FIG. 6 depicts a block diagram of a system upon which salient sampling for query size estimation may be implemented in accordance with an embodiment.

Referring to FIG. 6, a block diagram of an exemplary system 600 for salient sampling for query size estimation is generally shown in accordance with an embodiment. The system 600 includes a sampling algorithm 610 for performing salient sampling query size estimation that is executed by one or more computer programs located on a host system 604. In an embodiment, all or a portion of the algorithm 610 is part of a database management system executing on the host system 604. In another embodiment, all or a portion of the algorithm 610 is a component of a system that supports both transactions and queries.

The system 600 depicted in FIG. 6 includes one or more user systems 602 through which users (e.g., end users, database administrators) at one or more geographic locations may contact the host system 604 to initiate programs that execute database queries and/or transactions. The user systems 602 are coupled to the host system 604 via a network 606. Each user system 602 may be implemented using a general-purpose computer executing a computer program for carrying out the processes described herein. The user systems 602 may be personal computers (e.g., a lap top, a tablet computer, a cellular telephone) or host attached terminals. If the user systems 602 are personal computers, the processing described herein may be shared by a user system 602 and the host system 604. The user systems 602 may also include game consoles, network management devices, and field programmable gate arrays. In addition, multiple user systems 602 and/or host systems 604 may be concurrently operating to perform salient sampling.

The network 606 may be any type of known network including, but not limited to, a wide area network (WAN), a local area network (LAN), a global network (e.g. Internet), a virtual private network (VPN), a cloud network, and an intranet. The network 606 may be implemented using a wireless network or any kind of physical network implementation known in the art. A user system 602 may be coupled to the host system through multiple networks (e.g., cellular and Internet) so that not all user systems 602 are coupled to the host system 604 through the same network. One or more of the user systems 602 and the host system 604 may be connected to the network 606 in a wireless fashion. In one embodiment, the network is the Internet and one or more user systems 602 execute a user interface application (e.g. a web browser) to contact the host system 604 through the network 606. In another exemplary embodiment, the user system 602 is connected directly (i.e., not through the network 606) to the host system 604. In a further embodiment, the host system 604 is connected directly to or contains the storage device 608.

The storage device 608 includes data relating to salient sampling for query size estimation and may be implemented using a variety of devices for storing electronic information. In an embodiment, data stored in the storage device 608 includes, but is not limited to, one or more databases, database tables, indexes, and other data utilized by embodiments described herein. It is understood that the storage device 608 may be implemented using memory contained in the host system 604 or that it may be a separate physical device. The storage device 608 may be logically addressable as a consolidated data source across a distributed environment that includes the network 606. Information stored in the storage device 608 may be retrieved and manipulated via the host system 604 and/or via a user system 602.

The host system 604 depicted in FIG. 6 may be implemented using one or more servers operating in response to a computer program stored in a storage medium accessible by the server. The host system 604 may operate as a network server (e.g., a web server) to communicate with the user system 602. The host system 604 handles sending and receiving information to and from the user system 602 and can perform associated tasks. The host system 604 may also include a firewall to prevent unauthorized access to the host system 604 and enforce any limitations on authorized access. For instance, an administrator may have access to the entire system and have authority to modify portions of the system. A firewall may be implemented using conventional hardware and/or software as is known in the art.

The host system 604 may also operate as an application server. The host system 604 executes one or more computer programs, including an algorithm 610, to provide aspects of embodiments as described herein. Processing may be shared by the user system 602 and the host system 604 by providing an application to the user system 602. Alternatively, the user system 602 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention that are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Any flow diagrams depicted herein show just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A system for creating samples of database tables, the system comprising:
    at least one memory having computer readable computer instructions; and
    at least one processor for executing the computer readable instructions to perform a method comprising:
        identifying a first column and a second column in a first database table, each of the first and second columns having corresponding columns in one or more other database tables;
        applying one or more hash functions to values in the first column and second column, the applying including applying a first hash function to the values of the first column and applying a second hash function to the values of the second column;
        selecting a subset of the rows in the first database table where results of the first hash function meet a first numeric threshold, or where results of the second hash function meet a second numeric threshold;
        creating a sample database table corresponding to the result of a join operation of the subset of rows of the first database table and the one or more other database tables; and
        estimating a cardinality of a database query over the first database table by scaling the cardinality of the database query over the sample database table by a factor of 1/v where v is the volume of the selected subset of rows of the first database table relative to the first database table.

2. The system of claim 1, wherein the first hash function is different than the second hash function.

3. The system of claim 1, wherein the first hash function is the same as the second hash function.

4. The system of claim 1, wherein the first numeric threshold is different than the second numeric threshold.

5. The system of claim 1, wherein the first numeric threshold is the same as the second numeric threshold.

6. The system of claim 1, wherein the one of the one or more other database tables and the first and second columns are mentioned in a database query, and the identifying, applying, selecting and creating are performed for all of the database tables and columns being joined in the database query.

7. The system of claim 1, wherein the method further comprises computing the database query over the sample database table.

8. The system of claim 1, wherein the one or more other database tables and the first and second columns are mentioned in a database query, and the identifying, applying, selecting and creating are performed for all of the database tables and columns mentioned in the database query.

9. The system of claim 1, wherein one of the first hash function and second hash function is universal.

10. The system of claim 1, wherein the method 1 further comprises:
    expressing the database query as the disjoint union of two or more subqueries; and
    performing for each subquery:
        computing the subquery over the sample database tables; and
        estimating a cardinality of the database query as a cardinality of the subquery over the sample database tables divided by a volume of the selected subset of rows; and
    adding the resulting estimates.

11. A non-transitory computer readable storage media for creating samples of database tables, the non-transitory computer readable storage media having computer-readable program code embodied thereon, which when executed by a computer processor, causes the computer processor to implement a method, the method comprising:
    identifying a first column and a second column in a first database table, each of the first and second columns having corresponding columns in one or more other database tables;
    applying one or more hash functions to values in the first column and second column, the applying including applying a first hash function to the values of the first column and applying a second hash function to the values of the second column;
    selecting a subset of the rows in the first database table where results of the first hash function meet a first numeric threshold, or where results of the second hash function meet a second numeric threshold;
    creating a sample database table corresponding to the result of a join operation of the subset of rows of the first database table and the one or more other database tables; and
    estimating a cardinality of a database query over the first database table by scaling the cardinality of the database query over the sample database table by a factor of 1/v where v is the volume of the selected subset of rows of the first database table relative to the first database table.

12. The non-transitory computer-readable medium of claim 11, wherein the first hash function is different than the second hash function.

13. The non-transitory computer-readable medium of claim 11, wherein the first hash function is the same as the second hash function.

14. The non-transitory computer-readable medium of claim 11, wherein the first numeric threshold is different than the second numeric threshold.

15. The non-transitory computer-readable medium of claim 11, wherein the first numeric threshold is the same as the second numeric threshold.

16. The non-transitory computer-readable medium of claim 11, wherein the one of the one or more other database tables and the first and second columns are mentioned in a database query, and the identifying, applying, selecting and creating are performed for all of the database tables and columns being joined in the database query.

17. The non-transitory computer-readable medium of claim 11, wherein the method further comprises computing the database query over the sample database table.

18. The non-transitory computer-readable medium of claim 11, wherein the one or more other database tables and the first and second columns are mentioned in a database query, and the identifying, applying, selecting and creating are performed for all of the database tables and columns mentioned in the database query.

19. The non-transitory computer-readable medium of claim 11, wherein one of the first hash function and second hash function is universal.

20. The non-transitory computer-readable medium of claim 11, wherein the method further comprises:
 expressing the database query as the disjoint union of two or more subqueries; and
 performing for each subquery:
  computing the subquery over the sample database tables; and
  estimating a cardinality of the database query as a cardinality of the subquery over the sample database tables divided by a volume of the selected subset of rows; and
 adding the resulting estimates.

\* \* \* \* \*